United States Patent Office 2,709,148
Patented May 24, 1955

2,709,148

PRODUCTION OF LAMINATES

Heinrich Jacqué, Ludwigshafen (Rhine), Germany, assignor to Badische Anilin- & Soda-Fabrik Aktiengesellschaft, Ludwigshafen (Rhine), Germany No Drawing. Application September 27, 1951, Serial No. 248,639

Claims priority, application Germany October 12, 1950

8 Claims. (Cl. 154—139)

This invention relates to an improved process of producing laminates from vinyl chloride polymers.

It is already known to unite or weld foils, plates and the like to each other in a firmly adherent manner by the action of heat and pressure. In many cases this method of working cannot be used in practice because at the necessary high temperatures the foils, plates and the like stick to the rollers, presses or the like or undergo decomposition during the necessary duration of the heating. Moreover it is only in rare cases that this method of working can be carried out continuously, for example between a pair of rollers, because as a rule, in order to obtain a smooth surface of the shaped article, it is necessary to effect a cooling of the pressing apparatus and the shaped article while still under pressure, and this is not readily possible between a pair of rollers. To effect a satisfactory union without the use of pressure is possible only in very rare cases or not at all, even at very high temperatures, because the foils, plates and the like develop folds and bubbles during the heating and therefore are not in contact at many places and cannot unite.

I have now found that laminates, i. e. multi-layer shaped articles can be prepared from shapes having two preferred dimensions, such as foils, plates and the like, of vinyl chloride polymers in a simple manner, and even in a continuous operation, while avoiding the said difficulties by lightly sticking the foils, plates or the like together by the use of adhesives and/or by slight heating and pressure and then firmly uniting them by heating without the use of pressure to temperatures at which they are sticky. Foils, plates and the like suitable for the process are those of pure polyvinyl chloride and interpolymers of vinyl chloride and other polymerisable compounds, such as vinyl esters, vinyl ethers, acrylic esters, maleic esters and the like. They may be prepared in known manner by casting, rolling or the like; they may also contain additions, such as softening agents, dyestuffs, fillers and the like.

In order to obtain a faultless union, the foils, plates or the like must be joined together at all points without gaps, even though at first the union is not very strong, so that during the heat treatment to produce the final firm union with each other no faults can develop by shrinkage, bubble formation or the like. For example they may be uniformly provided with a solvent or a swelling agent or with a special adhesive on the surfaces to be joined. With a short wetting with solvents, swelling agents or adhesives, the foils to be joined can be passed through a slit or, advantageously, through a pair of rollers. The preliminary sticking of the foils, plates or the like can also be obtained between a pair of rollers with moderate heating, whereby no appreciable deformation or adhesion to the surface of the rollers takes place under the roller pressure.

The final intimate union of the laminates thus formed is effected by strong thermal action without the use of pressure in various ways. Thus the laminates can be led freely supported through a heated chamber or adjacent to radiating hot surfaces, advantageously under light tension. This final firm union can be effected in a technically simple manner by leading the foils over a hot rotating cylinder under weak tension. The temperatures necessary during this heat treatment are to a great extent dependent on the thickness, number and nature of the foils, plates or the like to be joined and the softening point of the vinyl chloride polymer used therefor. Difficultly weldable vinyl chloride polymers, as for example pure polyvinyl chloride, require a temperature at which the foils, plates or the like have practically no mechanical strength, for example temperatures above 200° C., preferably between 220° and 270° C.; more readily weldable vinyl chloride polymers, in particular interpolymers, require somewhat lower temperatures. In any case the temperatures must be high enough that the plates, foils and the like become sticky on their surfaces. The duration of the action of these high temperatures may be very short, for example up to about 1 second, with thin foils; with thicker foils a longer duration is necessary.

Completely smooth and glossy laminates can be obtained according to this invention without highly polished pressure plates or the like. Although relatively high temperatures are required for the intimate union of the foils, there is no trouble of sticking of the foils to the pressure plates or the like which heretofore were necessary. The duration of the action of the high temperatures may also be made so short that no decomposition of the polymers takes place. If laminates, for example thicker foils, are prepared according to this invention from rolled foils of polymers, there occurs simultaneously, during the heat treatment for the intimate union of the laminate, an annealing which becomes evident in an increased stretchability or extensibility, tensile strength, resistance to bending and impact resistance.

According to this invention laminated foils and plates may be obtained which are of very small thickness, for example to less than $25\mu$, or of such great thickness as can only be obtained with difficulty, or not at all, by casting or rolling. Foils, plates and the like from different initial materials or of different colours can be united together to produce special effects. Thus for example thick colourless transparent foils may be united with thin coloured foils, or soft and flexible foils with harder foils. Furthermore it is possible in this way to prepare completely pore-free combined foils from foils, in particular rolled foils, which are not entirely free from pores.

The process according to the invention is also very well suited to the production of magnetogram carriers by incorporating finely-particled magnetisable substances in at least one of the layers and then uniting the layers with each other by the above method. The resulting laminates may if desired be subjected to a further heat treatment with or without after-stretching. As magnetisable substances there may be used the iron or iron oxide powders usual for the production of magnetogram carriers or other magnetisable substances in finely divided form.

The thickness of the layers may vary within wide limits and it is usually advantageous for the layer which contains the magnetisable substance to be as thin as possible, down to less than $15\mu$. The remaining layers may have thicknesses of from about $30\mu$ up to 2 millimetres, depending on the purpose for which they are to be used and the required mechanical properties.

According to this invention it is possible to prepare magnetogram carriers in the form of laminated foils or plates from magnetisable layers of extremely small thickness, for example less than 10μ, with very small amounts of adhesive or without using adhesive, without the fine layer undergoing deleterious alteration in its shape or mechanical properties. By reason of the small thickness of the magnetisable layer, these magnetogram carriers give an excellent frequency action as well as excellent extinguishing and copying damping, properties which hitherto were obtainable only by casting the magnetisable layer onto a carrier foil. These foils may be used for radio, sound and recording purposes. By "frequency action" I mean the reproduction of high tone frequencies, particularly high tones. By the term "extinguishing damping" I mean the relative ease of erasion of the magnetic recording on the foil, erasion usually being effected by contacting the recording with a stronger magnetic field. By the use of the term "copying damping," an excellent feature of the magnetized foil that I describe, I mean that there is little interference from the foil in its recording ability. Recorded magnetic tone bands (coils) have a tendency, particularly those with a thick magnetic layer, to transmit their impulses or orientations corresponding to the tone recording, to adjoining layers. This tendency is of particular significance in the magnetic foil that I teach. Because of the small thickness of the magnetizable layer transmission of foil impulses is minimized. The thinner the magnetic layer, the less likely is there a hazard of undesired transmission within the foil components, that is, the better is the "copying damping." For the preparation there may also be used with advantage thin foils with finely divided magnetisable substances which have been obtained by rolling out. In this way magnetogram carriers are obtained having a high extensibility which, for example, may be pressed into grooved magnetogram carriers without damaging the layer; this is difficult or impossible with cast layers by reason of their low extensibility.

The following examples will further illustrate this invention but the invention is not limited to these examples.

*Example 1*

At least two foils having a thickness of about 40μ (prepared from highly polymerised vinyl chloride by rolling at about 170° C.) which have only a low resistance to creasing and contain pores are passed between a pair of rollers of which one is elastically mounted and provided with a resilient surface, the foils being wetted completely for a short time with cyclohexanone on the surfaces which are to be joined together, the pressure on the rollers being moderate and the temperature being between 20° to 50° C. or somewhat higher. The foils are thus loosely stuck together in a uniform manner, in particular without the formation of bubbles or folds. In order to improve the mechanical properties and effect the final union of the resulting laminated foil, it is led without employing pressure over an aluminium cylinder heated to 220° to 240° C. which is rotating at approximately the speed of supply of the foil, the duration of contact being 3 seconds and the stretch imparted being about 15%. For complete smoothing the foils may then be led over a stationary aluminium cylinder at 100° to 130° C. in order to stretch them 1.2 times in length and/or breadth. The individual layers of the practically pore-free foil thus obtained are so intimately united one with another that they cannot be separated either by mechanical or physical action. The foil has a smooth and glossy surface and a high extensibility and resistance to creasing.

In order to produce a specially high tensile strength in the length or breadth, the foils may be stretched at 110° to 130° C. up to about 3.5 times the original length or breadth or also consecutively or simultaneously stretched about 2.5 times the length and breadth. In this way a considerable increase in the tensile strength, up to more than double that of the unstretched foils, is obtained in the direction of the stretching.

*Example 2*

An intimate mixture of 45 parts by weight of finely divided magnetite and 55 parts of a highly polymerised vinyl chloride are rolled out, with an addition of small amounts of sliding agent and softener, at about 180° C. into a foil about 15 to 20μ in thickness. The resulting polyvinyl chloride foil containing magnetite is lightly united with a foil of highly polymerised vinyl chloride 70 to 80μ in thickness with the aid of cyclohexanone between a pair of rollers. The two-layer foil, if necessary after removal of the cyclohexanone by heating, is led for a short time over a hot surface at 230° C. whereby the layers are firmly united with each other and is then subjected to a stretching at about 110° C. The stretching can amount to about three times the original length of the foil without danger of dissolution of the layers.

Magnetogram carriers of this kind have, after cutting the foil into bands about 6 millimetres wide, a small elastic and lasting extension, an excellent tensile strength and a very smooth surface; the jamming is very slight. The reduction in thickness to about half the original thickness occasioned by the strong stretching furthermore leads to a considerable increase in the extinguishing and copying damping.

Instead of sticking the foils together by means of cyclohexanone, they may also be united by heating them to about 120° C. while they are pressed together and then subjecting the resulting laminated foil to a heat treatment at 230° C.

What I claim is:

1. A process of producing laminates from shapes prepared from vinyl chloride polymers and having two preferred dimensions which comprises lightly sticking the said shapes together, and then welding them together by heating without using pressure to temperatures at which the shapes become sticky at their surfaces and have relatively little mechanical strength for such time interval as will not result in polymer decomposition.

2. A process as claimed in claim 1 wherein finely divided magnetisable substances have been incorporated in at least one of the shapes.

3. A process according to claim 1 in which the lightly sticking together of the shapes is effected by slightly heating under pressure.

4. A process of producing laminates from foils prepared from vinyl chloride polymers which comprises lightly sticking the said foils together, and welding said foils by heating without pressure to temperatures at which the foils become sticky at their surfaces and have relatively little mechanical strength for such time interval as will not result in the polymer decomposition.

5. A process of producing a laminate from vinyl chloride polymer foils which comprises lightly sticking the said foils together, and welding said foils by heating without pressure at a temperature above about 200° C. at which the foils become sticky at their surfaces and have relatively little mechanical strength for such time interval as will not result in polymer decomposition.

6. A process of producing a laminate from vinyl chloride polymer foils which comprises wetting said foils with a swelling agent, pressing said foils together, and welding said foils by heating without pressure at a temperature at which the foils become sticky at their surfaces and have relatively little mechanical strength for such time interval as will not result in polymer decomposition.

7. A process of producing a magnetogram carrier in the form of a laminated foil which comprises lightly sticking together vinyl chloride polymer foils in at least one of which is incorporated a finely divided magnetizable substance, the sticking being effected by the use of a polymer swelling agent, welding said foils by heating without pressure at a temperature above about 200° C. at which the foils become sticky at their surfaces and have relatively little mechanical strength for such time interval as will not result in polymer decomposition, and stretching the resulting laminated foil up to about three times its initial length at a temperature of about 100° C. to 130° C.

8. A process as defined in claim 7 wherein the foils are prepared from highly polymerized vinyl chloride.

References Cited in the file of this patent

UNITED STATES PATENTS

| | | |
|---|---|---|
| 2,562,641 | Saunders | July 31, 1951 |
| 2,569,954 | Ruebensaal | Oct. 2, 1951 |